(12) United States Patent
Koike et al.

(10) Patent No.: US 8,103,036 B2
(45) Date of Patent: Jan. 24, 2012

(54) SPEAKER DEVICE AND TELEVISION RECEIVER USING THE SPEAKER DEVICE

(75) Inventors: Toshiyuki Koike, Mie (JP); Satoshi Koura, Mie (JP)

(73) Assignee: Panasonic Corporation, Osaka (JP)

( * ) Notice: Subject to any disclaimer, the term of this patent is extended or adjusted under 35 U.S.C. 154(b) by 709 days.

(21) Appl. No.: 12/293,924

(22) PCT Filed: Mar. 19, 2007

(86) PCT No.: PCT/JP2007/055537
§ 371 (c)(1),
(2), (4) Date: Sep. 22, 2008

(87) PCT Pub. No.: WO2007/119427
PCT Pub. Date: Oct. 25, 2007

(65) Prior Publication Data
US 2010/0289968 A1     Nov. 18, 2010

(30) Foreign Application Priority Data

Mar. 23, 2006   (JP) .................................. 2006-080278

(51) Int. Cl.
*H04N 5/60*     (2006.01)
(52) U.S. Cl. .................... 381/339; 381/190; 381/333
(58) Field of Classification Search .................. 381/152, 381/190, 191, 306, 333, 337, 353, 354, 388, 381/431
See application file for complete search history.

(56) References Cited

U.S. PATENT DOCUMENTS 4,410,064 A * 10/1983 Taddeo ........................ 181/152
7,454,025 B2 * 11/2008 Saiki ............................ 381/161

FOREIGN PATENT DOCUMENTS

| GB | 2344016 |   | 5/2000 |
| GB | 2344016 | A * | 5/2000 |
| JP | 57-2790 |   | 1/1982 |
| JP | 11-069474 |   | 3/1999 |
| JP | 2001-332074 |   | 11/2001 |
| JP | 2004-096273 |   | 3/2004 |
| JP | 2004-096273 | A | 3/2004 |
| JP | 3115376 |   | 9/2005 |

OTHER PUBLICATIONS

Chinese Office Action dated Jul. 20, 2011.
International Search Report for PCT/JP2007/055537; completed Jun. 14, 2007.
English Translation of JP 11-069474, which was previously cited in the IDS dated Sep. 22, 2008.
Japanese Office Action for JP 2006-080278 dated Sep. 20, 2011.

* cited by examiner

*Primary Examiner* — Roy Potter
(74) *Attorney, Agent, or Firm* — Pearne & Gordon LLP

(57) ABSTRACT

A loudspeaker device includes a loudspeaker box having a space therein, a loudspeaker unit, and a passive radiator. The loudspeaker unit and the passive radiator are attached to the loudspeaker box. The space of the loudspeaker box has a depth smaller on the passive radiator side than on the loudspeaker unit side. This structure allows the loudspeaker device to be mounted on a thin apparatus.

17 Claims, 3 Drawing Sheets

PRIOR ART

US 8,103,036 B2

SPEAKER DEVICE AND TELEVISION RECEIVER USING THE SPEAKER DEVICE

TECHNICAL FIELD

The present invention relates to a loudspeaker device which has a passive radiator and is used in a large flat television receiver or other similar equipment, and also relates to a television receiver using the loudspeaker device.

BACKGROUND ART

In recent years, large flat television receivers using plasma display panels or liquid crystal panels as the display units are becoming increasingly popular. In line with this, sound reproducing devices to be mounted on such television receivers are required to be smaller and thinner. At the same time, home theaters, terrestrial digital broadcasting, and other media are becoming popular and improving in sound quality. This trend requires the sound reproducing devices to have high-quality sound and high maximum input power.

In order to meet the demand for high-quality sound, low-frequency sound reproducing technology is inevitable which reproduces a powerful sound for movies and the like. One example of the low-frequency sound reproducing technology is a loudspeaker device having a passive radiator.

A conventional loudspeaker device having a passive radiator is shown in FIG. 5 in a sectional side view. As shown in FIG. 5, loudspeaker device 100 includes loudspeaker box 101 having two openings on its front surface. Loudspeaker box 101 includes loudspeaker unit 102 attached to one opening and passive radiator 103 attached to the other opening. Loudspeaker unit 102 includes magnetic circuit 102a. Passive radiator 103, which includes a flat diaphragm, is attached to loudspeaker box 101 via edge 103a.

Passive radiator 103 is driven by exhaust pressure to be applied to loudspeaker box 101 at the time of driving loudspeaker unit 102. This amplifies the sound reproduction in a predetermined low frequency region. One such conventional loudspeaker device 100 is disclosed in Japanese Utility Model Unexamined Publication No. S57-2790 (Patent Document 1).

Patent Document 1: Japanese Utility Model Unexamined Publication No. S57-2790

SUMMARY OF THE INVENTION

The loudspeaker device of the present invention includes a loudspeaker box having a space therein, a loudspeaker unit, and a passive radiator. The loudspeaker unit and the passive radiator are attached to the loudspeaker box. The space at the passive radiator side of the loudspeaker box has a depth smaller than that at the loudspeaker unit side. This structure allows the loudspeaker device to be mounted on a thin apparatus.

The television receiver of the present invention includes: a television receiver body; a flat display unit; an electrical circuit; and a loudspeaker device. The flat display unit is disposed at the television receiver body. The electrical circuit receives a television signal and outputs a video output signal and an audio output signal. The loudspeaker device includes a loudspeaker box having a space therein, a loudspeaker unit, and a passive radiator. The loudspeaker unit and the passive radiator are attached to the loudspeaker box. The space at the passive radiator side of the loudspeaker box has a width smaller than that at the loudspeaker unit side. The loudspeaker device is disposed behind the rear surface of the flat display unit at the television receiver body at least in such a manner that the passive radiator is disposed on the side surface side of the television receiver body. This structure achieves a thin television receiver.

Figure 1:
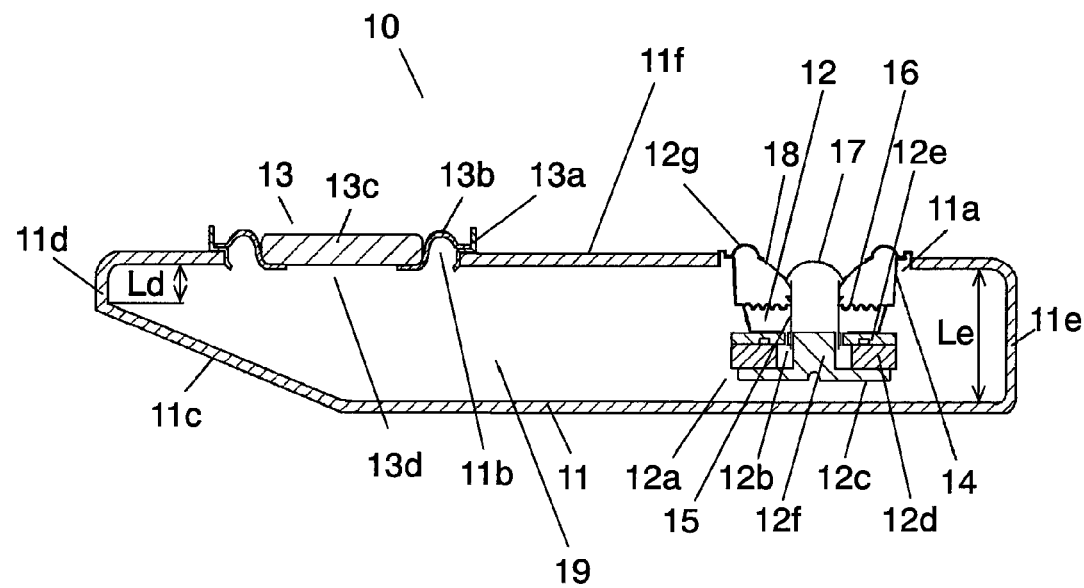
FIG. 1 is a top sectional view of a loudspeaker device according to a first exemplary embodiment of the present invention.

REFERENCE MARKS IN THE DRAWINGS 10 loudspeaker device
11 loudspeaker box
11a first opening
11b second opening
11d, 11e end
12 loudspeaker unit
13 passive radiator
19, 25 space
20 television receiver
20a television receiver body
20b top surface
20c side surface
20d bottom surface
21 flat display unit
21a side end
30 electrical circuit
32 reception circuit
34 video circuit
36 acoustic circuit
38 power supply circuit
40 gap
42 sound output hole

DETAILED DESCRIPTION OF PREFERRED EMBODIMENTS

Exemplary embodiments of the present invention are described as follows with reference to FIGS. 1 to 4.

First Exemplary Embodiment

FIG. 1 is a sectional view of loudspeaker device 10 according to the first exemplary embodiment of the present invention when seen from above. As shown in FIG. 1, loudspeaker device 10 is formed of a resin-molding and includes loudspeaker box 11 having space 19 therein. Loudspeaker box 11 is provided at front surface 11f thereof with two openings which include first opening 11a and second opening 11b. In other words, first opening 11a and second opening 11b are formed in the same surface of loudspeaker box 11. Loudspeaker box 11 has end 11d on the second opening 11b side, and end 11d has inclined part 11c on the rear surface. As a result, space 19 has a small depth Ld.

Loudspeaker unit 12 is attached to first opening 11a with screw clamps (unillustrated) via loudspeaker frame 14. Passive radiator 13 has a rectangular-shape and attached to second opening 11b via edge 13b.

Loudspeaker unit 12 includes magnetic circuit 12a having magnetic gap 12b, loudspeaker diaphragm 18, suspension 16, and dust cap 17. Magnetic circuit 12a is formed of bottom plate 12c, annular magnet 12d, and annular top plate 12e which are combined together. Bottom plate 12c includes center pole 12f. Loudspeaker diaphragm 18 is joined at its outer periphery to loudspeaker frame 14 via loudspeaker edge 12g, and is also joined at its inner periphery to voice coil 15. Voice coil 15 is inserted at one end into magnetic gap 12b. Suspension 16 is joined at its inner periphery to voice coil 15, and is joined at its outer periphery to loudspeaker frame 14. Dust cap 17 covers voice coil 15 from above. Loudspeaker frame 14 is joined at its bottom surface to top plate 12e.

Passive radiator 13 includes frame 13a, edge 13b, and flat diaphragm 13c. Frame 13a, which is formed of a sheet metal, includes screw holes (unillustrated) used to attach passive radiator 13 to loudspeaker box 11, and opening 13d having a rectangular-shape. Edge 13b functions as a support to join the outer periphery of flat diaphragm 13c to frame 13a. Flat diaphragm 13c is formed of a rectangular-shaped plastic molded sheet.

Thus, passive radiator 13 does not include a magnetic circuit. This allows loudspeaker box 11 to have inclined part 11c at the rear surface on the second opening 11b side. Consequently, the depth Ld of end 11d on the passive radiator 13 side is smaller than a depth Le of end 11e on the loudspeaker unit 12 side (Ld<Le). As a result, when loudspeaker device 10 is mounted on an apparatus (unillustrated), the apparatus can have a thin outer periphery, thereby increasing the thickness reduction thereof. In particular, the thickness of the apparatus on the side surface side can be reduced. As described hereinbefore, the apparatus on which to mount loudspeaker device 10 can be reduced in size by inclining one end 11d of loudspeaker device 10 so as to reduce the thickness.

Second Exemplary Embodiment

Figure 2:
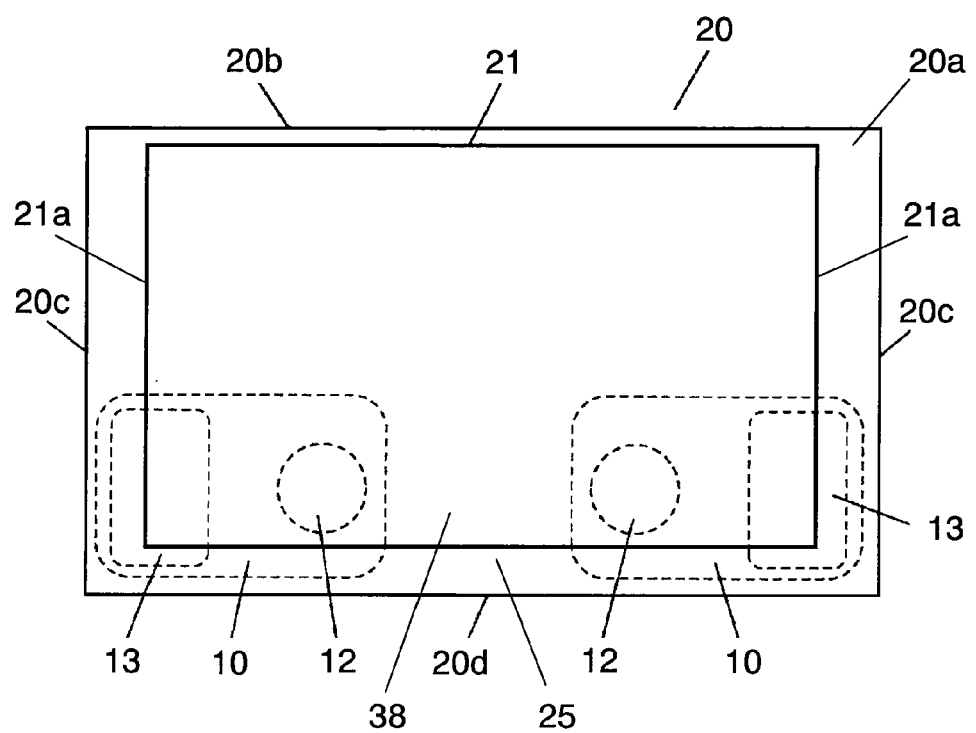
FIG. 2 is a front view of a loudspeaker device according to a second exemplary embodiment of the present invention and a television receiver mounted with the loudspeaker device.
Figure 3:
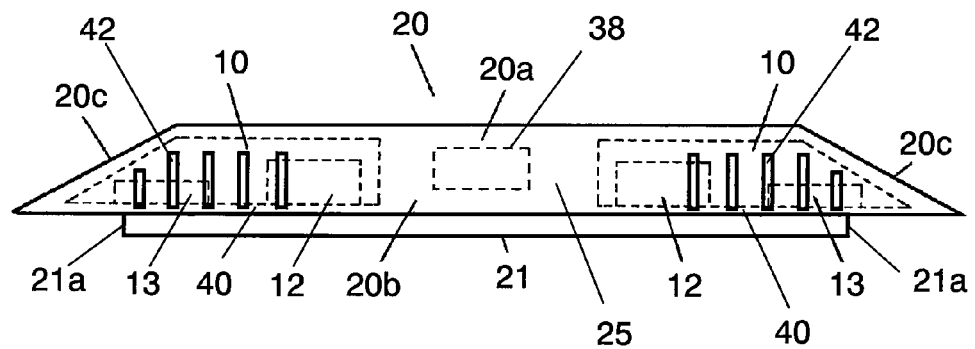
FIG. 3 is a top view of the television receiver of FIG. 2.
Figure 4:
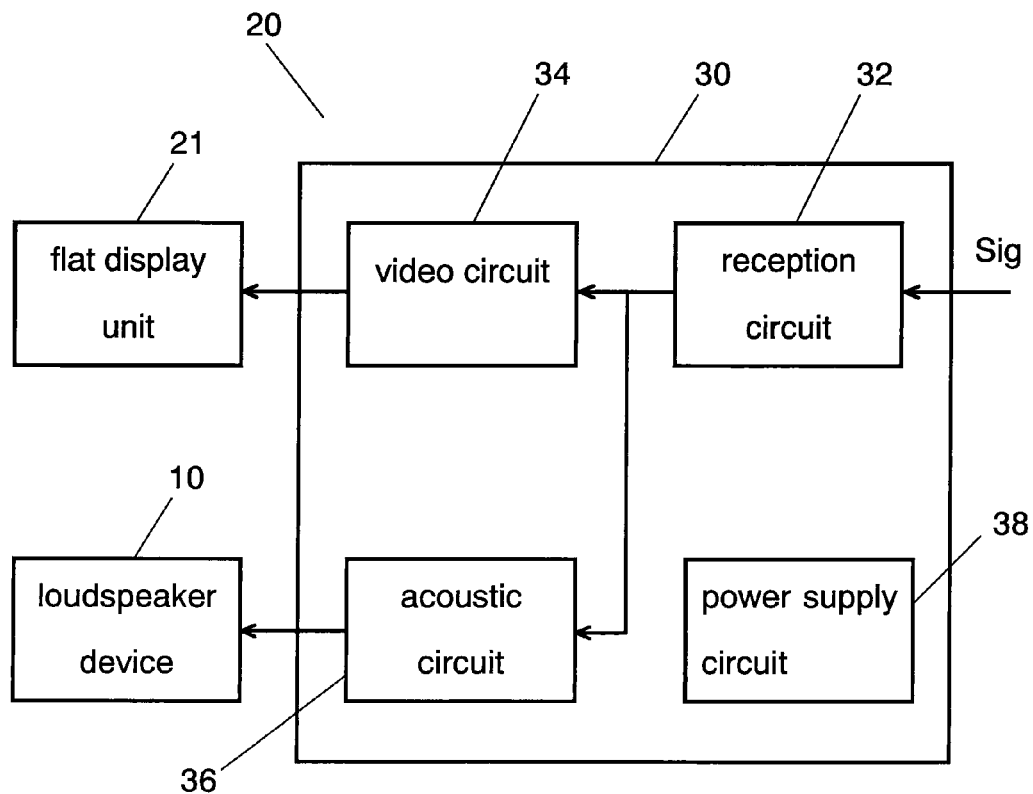
FIG. 4 is a block diagram of the television receiver of FIG. 2.
Figure 5:
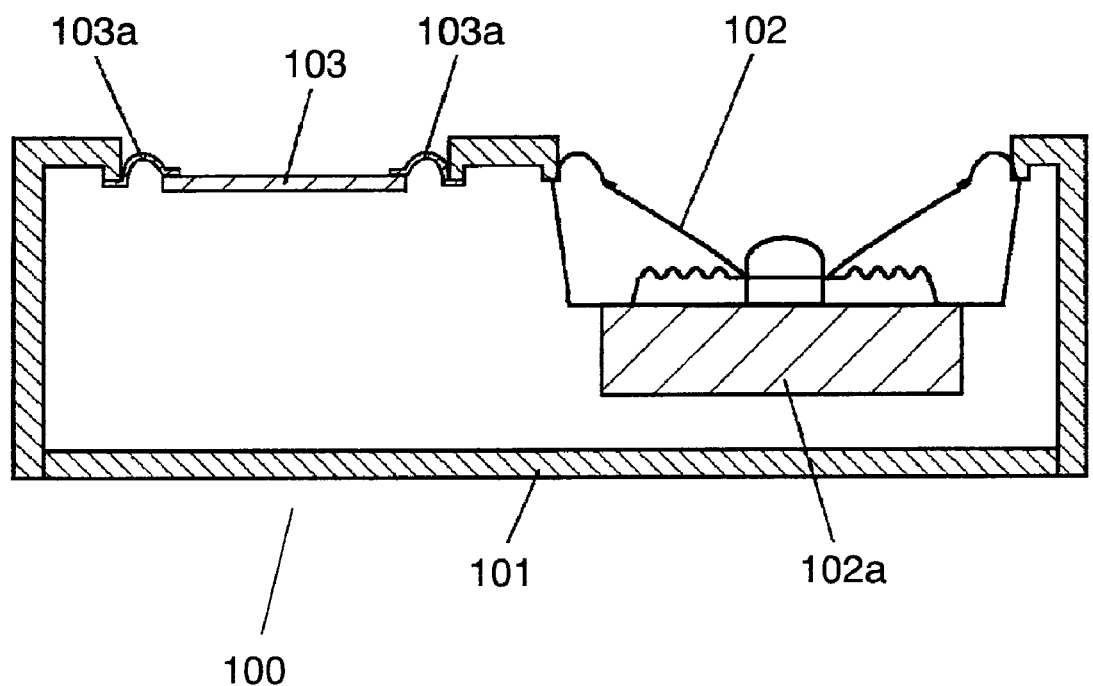
FIG. 5 is a sectional side view of a conventional loudspeaker device.

FIG. 2 is a front view of television receiver 20 mounted with loudspeaker device 10 according to a second exemplary embodiment of the present invention. FIG. 3 is a top view of television receiver 20 of FIG. 2. FIG. 4 is a block diagram of television receiver 20 of FIG. 2.

As shown in FIGS. 2 to 4, television receiver 20 includes television receiver body 20a (hereinafter, body 20a) as a cabinet, flat display unit 21, loudspeaker devices 10, and electrical circuit 30. Flat display unit 21 is disposed at a front of body 20a and formed of a thin, flat display panel such as a plasma display panel, a liquid crystal panel, an organic EL (electroluminescence) panel, or an FED (field emission display) panel.

Loudspeaker devices 10 are disposed behind flat display unit 21 with gap 40 therebetween. Electrical circuit 30 is connected to flat display unit 21 and loudspeaker devices 10. Loudspeaker devices 10 are the one described in the first exemplary embodiment, and each includes loudspeaker unit 12 and passive radiator 13. Body 20a includes at least a pair of loudspeaker devices 10 arranged in such a manner that their passive radiators 13 are disposed at the side ends 21a sides, or at the right and left sides of flat display unit 21.

As shown in FIG. 4, electrical circuit 30 includes reception circuit 32, video circuit 34, acoustic circuit 36, and power supply circuit 38. Reception circuit 32 receives a television signal Sig. Video circuit 34 takes out a video output signal from the television signal Sig that reception circuit 32 has received, and outputs it to flat display unit 21. Flat display unit 21 displays video based on the video output signal received from video circuit 34. Acoustic circuit 36 takes out an audio output signal from the television signal Sig that reception circuit 32 has received, and inputs it to loudspeaker devices 10. Loudspeaker devices 10 output sound based on the audio output signal received from acoustic circuit 36. Power supply circuit 38 supplies power to reception circuit 32, video circuit 34, acoustic circuit 36, flat display unit 21, and loudspeaker devices 10.

In general, when arranged side by side, a pair of loudspeaker devices 10 are spaced from each other in such a manner that their passive radiators 13 are adjacent to each other to secure the separation of the right and left loudspeaker units 12. This is because passive radiators 13 are sound reproduction devices to amplify the sound reproduction in a less directional low-frequency sound region and do not require separation therebetween. In the present exemplary embodiment, on the other hand, end 11d on the passive radiator 13 side of each loudspeaker device 10 is disposed at the side surface 20c side of television receiver 20. This allows each loudspeaker device 10 to have a small depth Ld at the passive radiator 13 side, making television receiver 20 have a thin outer periphery. In particular, the thickness of television receiver 20 at the side surface 20c side can be reduced.

In the present exemplary embodiment, loudspeaker devices 10 are separated by space 25 formed therebetween. It allows the separation between loudspeaker devices 10. Electrical circuit 30 such as power supply circuit 38 may be disposed between loudspeaker devices 10. The separation between loudspeaker devices 10 may be improved by providing vertical bars (unillustrated).

Gap 40 between flat display unit 21 and loudspeaker devices 10 communicates with a plurality of sound output holes 42. This allows the emphasized low-frequency sound to be emitted through sound output holes 42 to the outside of body 20a. Sound output holes 42 are provided at least at top surface 20b, side surface 20c, or bottom surface 20d of body 20a of television receiver 20. In television receiver 20, sound output holes 42 are provided at top surface 20b.

In the present exemplary embodiment, television receiver 20 is provided with a pair of loudspeaker devices 10 having the same shape; however, television receiver 20 does not necessarily require loudspeaker devices 10 of the same shape. The pair of loudspeaker devices 10 may have different shapes and the same properties. In loudspeaker boxes 11 of these loudspeaker devices 10, the depth Ld on the passive radiator 13 side is smaller than the depth Le on the loudspeaker unit 12 side as in the first exemplary embodiment. This provides the same action and effect as in the first exemplary embodiment.

INDUSTRIAL APPLICABILITY

As described hereinbefore, the loudspeaker device of the present invention has the advantages of being small and thin, having high maximum input power, and capable of reproducing low-frequency sound. The loudspeaker device is widely applicable to video and audio equipment that is required to be space saving and highly efficient.

The invention claimed is:

1. A loudspeaker device comprising:
a loudspeaker box having a space therein;
a loudspeaker unit attached to the loudspeaker box at a front surface; and
a passive radiator attached to the loudspeaker box at the front surface, wherein
the space at a side of the passive radiator between the passive radiator and an end of the loudspeaker box has a first depth extending from the front surface to an opposing rear surface that is smaller than a second depth at a side of the loudspeaker unit between the loudspeaker unit and an opposing end of the loudspeaker box.

2. The loudspeaker device of claim 1, wherein the loudspeaker unit and the passive radiator are attached at a same surface of the loudspeaker box.

3. A television receiver comprising:
a television receiver body;
a flat display unit provided at the television receiver body;
an electrical circuit for receiving a television signal and outputting a video output signal and an audio output signal;
a loudspeaker device including:
a loudspeaker box having a space therein;
a loudspeaker unit attached to the loudspeaker box; and
a passive radiator attached to the loudspeaker box,
wherein the space at a side of the passive radiator of the loudspeaker box has a depth smaller than that at a side of the loudspeaker unit,
wherein the loudspeaker device is disposed behind a rear surface of the flat display unit at the television receiver body at least in such a manner that the passive radiator is disposed on a side of a side surface of the television receiver body.

4. The television receiver of claim 3, wherein a pair of the loudspeaker devices are disposed in such a manner that the passive radiators are disposed on both sides of side surfaces of the television receiver body.

5. The television receiver of claim 3, wherein the loudspeaker unit and the passive radiator are attached on a same surface of the loudspeaker box.

6. The television receiver of claim 3, further comprising:
a gap between the loudspeaker device and the rear surface of the flat display unit; and
a plurality of sound output holes at least at one of the side surface, a bottom surface, and a top surface of the television receiver body.

7. The television receiver of claim 4, further comprising:
a gap between the loudspeaker device and the rear surface of the flat display unit; and
a plurality of sound output holes at least at one of the side surface, a bottom surface, and a top surface of the television receiver body.

8. The television receiver of claim 5, further comprising:
a gap between the loudspeaker device and the rear surface of the flat display unit; and
a plurality of sound output holes at least at one of the side surface, a bottom surface, and a top surface of the television receiver body.

9. The loudspeaker device of claim 1, wherein the loudspeaker box includes a substantially planar inclined part positioned opposite from the passive radiator and adjacent the space at the side of the passive radiator.

10. The loudspeaker device of claim 9, wherein the substantially planar inclined part extends from the end of the loudspeaker box adjacent the passive radiator to the rear surface, further wherein the substantially planar inclined part extends along a single plane.

11. The loudspeaker device of claim 1, wherein any first depth is smaller than any second depth.

12. A television receiver comprising:
a television receiver body;
a flat display unit provided at the television receiver body;
an electrical circuit for receiving a television signal and outputting a video output signal and an audio output signal;
a loudspeaker device including:
a loudspeaker box having a space therein;
a loudspeaker unit attached to the loudspeaker box; and
a passive radiator attached to the loudspeaker box,
wherein the space at a side of the passive radiator of the loudspeaker box has a first depth smaller than that at a side of the loudspeaker unit.

13. The television receiver of claim 10, wherein the loudspeaker device is disposed behind a rear surface of the flat display unit at the television receiver body.

14. The television receiver of claim 12, wherein the space at the side of the passive radiator between the passive radiator and an end of the loudspeaker box has the first depth extending from the front surface to an opposing rear surface that is smaller than a second depth at the side of the loudspeaker unit between the loudspeaker unit and an opposing end of the loudspeaker box.

15. The television receiver of claim 14, wherein any first depth is smaller than any second depth.

16. A loudspeaker device for mounting an apparatus comprising:
a loudspeaker box having a space therein;
a loudspeaker unit attached to the loudspeaker box at a front surface; and
a passive radiator attached to the loudspeaker box at the front surface, wherein
the space at a side of the passive radiator between the passive radiator and an end of the loudspeaker box has a first depth extending from the front surface to an opposing rear surface that is smaller than a second depth at a side of the loudspeaker unit between the loudspeaker unit and an opposing end for reducing a thickness of an outer periphery of the apparatus on a side surface of the apparatus.

17. The loudspeaker device of claim 16, wherein any first depth is smaller than any second depth.

* * * * *